(12) United States Patent
Chhaya et al.

(10) Patent No.: US 11,783,584 B2
(45) Date of Patent: Oct. 10, 2023

(54) AUTOMATED DIGITAL DOCUMENT GENERATION FROM DIGITAL VIDEOS

(71) Applicant: Adobe Inc., San Jose, CA (US)

(72) Inventors: Niyati Himanshu Chhaya, Hyderabad (IN); Tripti Shukla, Lucknow (IN); Jeevana Kruthi Karnuthala, Kurnool (IN); Bhanu Prakash Reddy Guda, Pittsburgh, PA (US); Ayudh Saxena, Pune (IN); Abhinav Bohra, Ahmedabad (IN); Abhilasha Sancheti, Bhilwara (IN); Aanisha Bhattacharyya, Hooghly (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/691,526

(22) Filed: Mar. 10, 2022

(65) Prior Publication Data

US 2023/0290146 A1    Sep. 14, 2023

(51) Int. Cl.
*G06V 20/40* (2022.01)
*G06N 20/00* (2019.01)
*G06F 16/73* (2019.01)
*G06V 10/86* (2022.01)
*G06F 40/166* (2020.01)

(52) U.S. Cl.
CPC .............. *G06V 20/47* (2022.01); *G06F 16/73* (2019.01); *G06F 40/166* (2020.01); *G06N 20/00* (2019.01); *G06V 10/86* (2022.01); *G06V 20/41* (2022.01)

(58) Field of Classification Search
CPC ..................................................... G06V 20/47
See application file for complete search history.

(56) References Cited

U.S. PATENT DOCUMENTS

| 7,640,494 | B1 * | 12/2009 | Chen et al. | ............ G06F 17/00 |
| 2010/0050083 | A1 * | 2/2010 | Axen et al. | ............ G06F 3/048 |
| 2017/0062013 | A1 * | 3/2017 | Carter et al. | ........... G11B 27/34 |
| 2017/0262159 | A1 * | 9/2017 | Denoue et al. | ..... G06F 3/04842 |

OTHER PUBLICATIONS

"Article Generator", Free Article Generator Online [retrieved Feb. 16, 2022]. Retrieved from the Internet <https://articlegenerator.org/>., 2 Pages.
"Articleforge 3.0", Glimpse.ai [retrieved Feb. 16, 2022]. Retrieved from the Internet <https://www.articleforge.com/>., 2015, 6 Pages.
"Document Management & Workflow Software", R2 Docuo [retrieved Feb. 16, 2022]. Retrieved from the Internet <https://www.r2docuo.com/en/>., 2012, 7 Pages.
"Docupilot", Flackon Inc. [retrieved Feb. 16, 2022]. Retrieved from the Internet <https://docupilot.app/>., 2018, 5 Pages.

(Continued)

*Primary Examiner* — James J Debrow
(74) *Attorney, Agent, or Firm* — FIG. 1 Patents

(57) ABSTRACT

Techniques are described that support automated generation of a digital document from digital videos using machine learning. The digital document includes textual components that describe a sequence of entity and action descriptions from the digital video. These techniques are usable to generate a single digital document based on a plurality of digital videos as well as incorporate user-specified constraints in the generation of the digital document.

20 Claims, 12 Drawing Sheets

(56) References Cited

OTHER PUBLICATIONS

"Nintex Process Management and Workflow Automation Software", Nintex UK Ltd [retrieved Feb. 16, 2022]. Retrieved from the Internet <https://www.nintex.com/>., 2005, 4 Pages.

"RecipeGPT", SMU Living Analytics Research Centre [retrieved Feb. 16, 2022]. Retrieved from the Internet <https://recipegpt.org/>., 2020, 1 Page.

"Speech to Text", Microsoft [retrieved Feb. 17, 2022]. Retrieved from the Internet <https://azure.microsoft.com/en-in/services/cognitive-services/speech-to-text/#faq>., 2021, 11 Pages.

Bień, Michai, et al., "RecipeNLG: A Cooking Recipes Dataset for Semi-Structured Text Generation", INLG [retrieved Feb. 16, 2022]. Retrieved from the Internet <https://aclanthology.org/2020.inlg-1.4.pdf>., Dec. 2020, 7 Pages.

Canny, John, "A Computational Approach to Edge Detection", IEEE Transactions on Pattern Analysis and Machine Intelligence, vol. PAMI-8, No. 6 [retrieved Feb. 17, 2022]. Retrieved from the Internet <https://doi.org/10.1109/TPAMI.1986.4767851>., Nov. 1986, 20 Pages.

Damen, Dima, et al., "The EPIC-KITCHENS Dataset: Collection, Challenges and Baselines", Cornell University arXiv, arXiv.org [retrieved Feb. 17, 2022]. Retrieved from the Internet <https://arxiv.org/pdf/2005.00343.pdf>., Apr. 29, 2020, 18 Pages.

Devlin, Jacob, et al., "BERT: Pre-Training of Deep Bidirectional Transformers for Language Understanding", Cornell University, arXiv Preprint, arXiv.org [retrieved on Apr. 27, 2022]. Retrieved from the Internet <https://arxiv.org/pdf/1810.04805.pdf>., May 24, 2019, 16 pages.

Gildea, Daniel, et al., "Automatic Labeling of Semantic Roles", Computational Linguistics vol. 28, No. 3 [retrieved Feb. 17, 2022]. Retrieved from the Internet <http://I3s.de/~zerr/clusterlabelling/s1.pdf>., Sep. 2002, 44 Pages.

Hartigan, J. A., et al., "Algorithm AS 136: A K-Means Clustering Algorithm", Journal of the Royal Statistical Society vol. 28, No. 1 [retrieved Feb. 17, 2022]. Retrieved from the Internet <https://www.stat.cmu.edu/~rnugent/PCMI2016/papers/HartiganKMeans.pdf>., 1979, 10 Pages.

Haussmann, Steven, et al., "FoodKG: A Semantics-Driven Knowledge Graph for Food Recommendation", International Semantic Web Conference [retrieved Feb. 17, 2022]. Retrieved from the Internet <http://www.cs.rpi.edu/~zaki/PaperDir/ISWC19.pdf>., Oct. 2019, 16 Pages.

He, Kaiming, et al., "Deep Residual Learning for Image Recognition", Proceedings of the IEEE conference on computer vision and pattern recognition, 2016 [retrieved Feb. 18, 2022], Retrieved from the Internet: <https://openaccess.thecvf.com/content_cvpr_2016/papers/He_Deep_Residual_Learning_CVPR_2016_paper.pdf>., Jun. 2016, 12 pages.

Lee, Helena H, et al., "RecipeGPT: Generative Pre-training Based Cooking Recipe Generation and Evaluation System", Companion Proceedings of the Web Conference 2020 [retrieved Feb. 16, 2022]. Retrieved from the Internet <https://drive.google.com/file/d/1oqDZ6t3likXNC-f7G3uYuAdzingA1Wdc/view>, Apr. 20, 2020, 4 Pages.

Marín, Javier, et al., "Recipe1M+: A Dataset for Learning Cross-Modal Embeddings for Cooking Recipes and Food Images", IEEE Transactions on Pattern Analysis and Machine Intelligence vol. 43, No. 1 [retrieved Feb. 16, 2022]. Retrieved from the Internet <10.1109/TPAMI.2019.2927476>., Jul. 9, 2019, 17 Pages.

Nishimura, Taichi, et al., "Procedural Text Generation from a Photo Sequence", Proceedings of the 12th International Conference on Natural Language Generation [retrieved Feb. 17, 2022]. Retrieved from the Internet <https://aclanthology.org/W19-8650.pdf>., 2019, 6 Pages.

Radford, Alec, et al., "Learning Transferable Visual Models From Natural Language Supervision", Cornell University arXiv, arXiv.org [retrieved Feb. 17, 2022]. Retrieved from the Internet <https://arxiv.org/pdf/2103.00020.pdf>., Feb. 26, 2021, 48 Pages.

Salvador, Amaia, et al., "Inverse Cooking: Recipe Generation From Food Images", IEEE/CVF Conference on Computer Vision and Pattern Recognition (CVPR) [retrieved feb. 17, 2022]. Retrieved from the Internet <https://arxiv.org/pdf/1812.06164.pdf>., 2019, 24 Pages.

Sener, Fadime, et al., "Zero-Shot Anticipation for Instructional Activities", Cornell University arXiv, arXiv.org [retrieved Feb. 17, 2022]. Retrieved from the Internet <https://arxiv.org/pdf/1812.02501.pdf>., Oct. 20, 2019, 18 Pages.

Shi, Peng, et al., "Simple BERT Models for Relation Extraction and Semantic Role Labeling", Cornell University arXiv, arXiv.org [retrieved Feb. 17, 2022]. Retrieved from the Internet <https://arxiv.org/pdf/1904.05255.pdf>., Apr. 10, 2019, 6 Pages.

Ushiku, Atsushi, et al., "Procedural Text Generation from an Execution Video", International Joint Conference on Natural Language Processing [retrieved Feb. 17, 2022]. Retrieved from the Internet <http://www.Ista.media.kyoto-u.ac.jp/publications/ushiku-IJCNLP17.pdf>., 2017, 10 Pages.

Vaswani, Ashish, et al., "Attention Is All You Need", Cornell University arXiv Preprint, arXiv.org [retrieved Feb. 17, 2022]. Retrieved from the Internet <https://arxiv.org/pdf/1706.03762.pdf>., Dec. 6, 2017, 15 pages.

Xu, Frank F, et al., "A Benchmark for Structured Procedural Knowledge Extraction from Cooking Videos", Cornell University arXiv, arXiv.org [retrieved Feb. 17, 2022]. Retrieved from the Internet <https://arxiv.org/pdf/2005.00706.pdf>., Oct. 9, 2020, 17 Pages.

Zhou, Luowei, et al., "End-to-End Dense Video Captioning with Masked Transformer", Cornell University arXiv, arXiv.org [retrieved Feb. 17, 2022]. Retrieved from the Internet <https://arxiv.org/pdf/1804.00819.pdf>., Apr. 3, 2018, 13 pages.

Zhou, Luowei, et al., "Towards Automatic Learning of Procedures from Web Instructional Videos", Cornell University arXiv, arXiv.org [retrieved Feb. 17, 2022]. Retrieved from the Internet <https://arxiv.org/pdf/1703.09788.pdf>., Nov. 21, 2017, 10 Pages.

Zhou, Luowei, et al., "YouCook2 Dataset", University of Michigan [retrieved Feb. 17, 2022]. Retrieved from the Internet <http://youcook2.eecs.umich.edu/>., 2017, 4 Pages.

\* cited by examiner

Algorithm 1: The Traversal Algorithm

Input: A weighted directed graph where nodes denote action verbs and edge weights denote transition probabilities
Output: A set of optimal paths 1. baseNode ← indexof('background')
2. shortestPaths ← Dijkstra(baseNode)
3. paths ← {}
4. for path ← 1 to len(shortestPaths) do
5.     if len(path) ≥ 3 and len(paths) ≤ 15000 then
6.         paths += {path + DFS (path[-1], baseNode)}
7.     end if
8. end for
9. return paths
10. end

Fig. 10

```
Algorithm 2: The Path Selection Algorithm
  Input: Optimal paths obtained from traversal algorithm
  Output: Best Path
1  max ← 0
2  bestPath ← {}
3  for path ← 0 to len(paths) do
4      if sumOfEdgeWeights(path) ≥ max then
5          bestPath ← path
6          max ← sumOfEdgeWeights(path)
7      end if
8  end for
9  return bestPath
10 end
```

Fig. 11

Algorithm 3: The Mid-way Step Removal Algorithm

Input: Action sequence and verb to be removed
Output: A list of new nodes

1  procedure MID-WAY (verb, path)
2     new_nodes ← [ ]
3     for node ← len(path) to 0 do
4        if noOfNeighbours(path[node]) ≤ 1 or verb in Neighbours(path[node]) and noOfNeighbours(path[node]) ≤ 1
5           then continue
6        else
7           new_nodes += Neighbours(path[node])
8           break
9        end if
10    end for
11    return new_nodes, node, verb, path
12 end procedure

Fig. 12

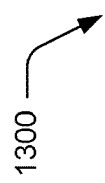

Algorithm 4: The Ingredient-Node Removal Algorithm

Input: *A weighted directed graph and ingredient list to be removed*
Output: *A list of removable nodes*
1 procedure REMOVE-INGREDIENT-NODES(*rem_ing, localGraphNodes*)
2     *rem_nodes* ← [ ]
3     for *node* ← *0 to len(local)* do
4        If *cardinality(node)* ≥ *len(localGraphNodes)/2 and* remIngInMetaData(*nodes*)
5           then *rem_nodes* + =*node*
6        end if
7     end for
8     return *rem_nodes*
9 end procedure

Fig. 13

AUTOMATED DIGITAL DOCUMENT GENERATION FROM DIGITAL VIDEOS

BACKGROUND

Digital video sharing system have been developed to disseminate hundreds of millions of digital videos relating to a diverse range of topics. As such, digital videos are used to convey a wide variety of information. For example, client devices access the digital video sharing service via a network to watch instruction videos, tutorials, and so on in order to gain insight into a desired topic.

Conventional techniques used to consume digital videos, however, involve a significant commitment on the part of a user to view and listen to the digital video to obtain the information about the topic from the video. Consequently, even though digital videos are useful in conveying detailed information on a particular topic, viewing of the digital video is not feasible in each scenario that relates to that topic. A digital video instructing a user on how to change a tire, for instance, is difficult to consume roadside where failure of a tire has occurred. Further, consumption of digital videos often involves a significant time commitment to view and understand the digital video, which is compounded when multiple digital videos are involved in order to gain a desired amount of information on the topic. Accordingly, conventional techniques used to consume the digital videos fail in common usage scenarios encountered in everyday life.

SUMMARY

Techniques are described that support automated generation of a digital document from digital videos using machine learning. The digital document includes textual components that describe a sequence of entity and action descriptions from the digital video. These techniques are usable to generate a single digital document based on a plurality of digital videos as well as incorporate user-specified constraints in the generation of the digital document, e.g., length, semantics, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 10 depicts an example implementation of a traversal algorithm.

FIG. 11 depicts an example implementation of a path selection algorithm.

FIG. 12 depicts an example implementation of a mid-way step removal algorithm.

FIG. 13 depicts an example of an entity-node removal algorithm in which the entity is an ingredient, e.g., in a recipe scenario.

DETAILED DESCRIPTION

Overview

Figure 1:
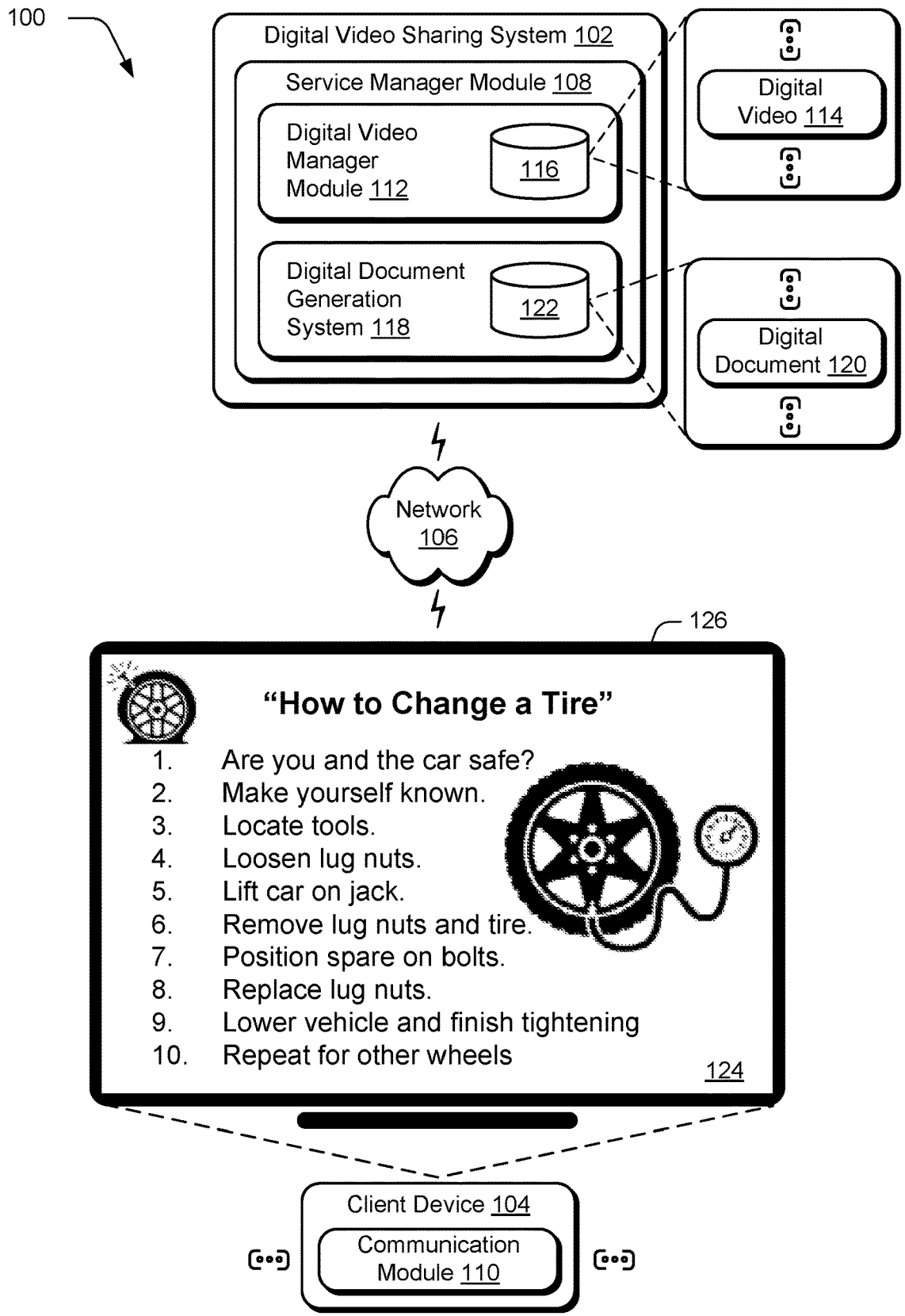
FIG. 1 is an illustration of a digital medium environment in an example implementation that is operable to employ digital document generation techniques described herein.

Digital videos are employed in a variety of scenarios to provide insight on a variety of topics. However, consumption of the digital videos typically involves significant time commitments, e.g., from a few minutes to several hours. Additionally, conventional consumption techniques further involve focused attention on the part of a user to view and listen to the digital videos in order to gain this insight. Further, digital video sharing services include hundreds of millions of digital videos. Therefore, navigation through this multitude and subsequent consumption of the digital videos using conventional techniques is inefficient and involves use of significant amounts of resources by the systems to disseminate the digital videos and devices used to consume the digital videos.

Further, conventional consumption techniques fail in scenarios in which a user is not able to adequately focus on consumption of the digital videos. A digital video of how to change a tire on a particular type of automobile, for instance, is difficult to consume roadside when a tire has failed in real life. Likewise, interaction with a digital video involving detailed baking instructions is difficult in a kitchen during actual attempts to bake an item described in the digital video. This challenge is compounded in conventional techniques when multiple digital videos are involved to provide a level of desired insight into the topic.

Accordingly, techniques are described that support automated generation of digital documents from digital videos. The digital document includes textual components that describe a sequence of entity and action descriptions from the digital video. In this way, the digital document is readily consumable using a client device with increased efficiency over conventional techniques that involve viewing an entirety of the digital video over time. Because these techniques are automated, the techniques are usable to increase functionality made available by digital video sharing systems that supply access to hundreds of millions of digital videos, which is not feasible using manual techniques, especially for preexisting digital videos. Further, these techniques are usable to generate a single digital document based on a plurality of digital videos. This increases accuracy of entity and action descriptions included in the textual components of the digital document and avoids limitations of conventional techniques that involve individual consumption of each of the digital videos.

In one example, a search is performed to locate digital videos that pertain to a particular topic. A digital video sharing system, for instance, supports a keyword search to locate digital videos of interest, e.g., "how to change a tire." In response, a search result is received that includes representations of digital videos that correspond to the keyword search. A user input is then received that selects representations to specify a plurality of digital videos that are to be used to generate a digital document. In this example, the user input in this instance is used to select digital videos that involve changing a tire and avoid digital videos merely describing tires, tire reviews, and so on that are not related to a topic of interest.

In response, a digital document generation system generates a digital document, automatically and without further user intervention, based on the plurality of digital videos. As part of generating the digital document, the digital document generation system is also configured to support user-defined constraints, e.g., a length of the document, number of steps, semantics, layout, and so forth.

The digital document generation system generates a transcript of digital audio included in the digital videos. The system also extracts key clips from the digital videos using a key clip extraction module, e.g., as predefined collections of frames. An action detection module is then utilized (e.g., as a binary classifier) using machine learning to compute a combined representation of the key clips and corresponding portions from the transcript to identify which key clips likely contain actions and therefore are referred to as "action clips."

A sequence generation is then employed to generate action sequences based on the action clips, e.g., for each of the plurality of digital videos. To do so, a verb detection module identifies verbs corresponding to the action clips, e.g., by processing frames of the action clips and/or portions of the transcript that correspond to the action clips.

An action graph generation module is then utilized to generate an action graph based on the action sequences. The action graph represents actions as nodes and includes edges that connect the nodes based on the verbs from the action sequences. The edges are weighted based on a probability of transition from one action to another, e.g., as edge weights between respective nodes.

A path selection module of the digital document generation system then selects a path. This is performed by traversing the action graph from node-to-node, e.g., based on the edge weights using the probabilities of transitions between respective nodes. The selected path is utilized by a frame location module to find key frames by mapping the nodes back to the action clips. The frame location module, for instance, locates a key frame from a collection of frames from respective action clips using a clustering technique. To do so, the decoding module takes as an input the frames from the action clip along with corresponding portions of the transcript, e.g., as a joint frame-transcript representation. A centroid is computed for each of the frames in the action clip, and a frame that is closest to the centroid is selected as a frame that is representative of the action client, i.e., is the "key frame."

A decoding module is then utilized by the digital document generation system to generate textual components based on the frames. The textual components describe entities and corresponding action descriptions. In a baking scenario, for instance, the entities are ingredients and the action descriptions are instructions involving those ingredients, e.g., "fold eggs into flour." The entities are identified by an entity decoding module from portions of transcripts corresponding to the frames and/or from the frames themselves, e.g., using image processing and machine-learning classifiers.

The entities identified for each of the frames are processed using machine learning along with the frames using an action description decoding module to generate action descriptions for each of the entities. Thus, the textual components describe a sequence of entity and action descriptions that follow the path generated from the action graph above, e.g., using the verbs. A coherence enforcement module is also usable to enforce coherence between successive steps in the sequence, which is then output as a digital document. In an implementation, generation of the digital document also includes selection of a digital image that is representative of a topic of the sequence being described. In this way, the digital document is usable to concisely describe content of a plurality of digital videos in a format that is readily consumable in a variety of scenarios which is not feasible in conventional digital video consumption techniques. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Digital Medium Environment

FIG. 1 is an illustration of a digital medium environment 100 in an example implementation that is operable to employ digital document generation techniques described herein. The illustrated environment 100 includes a digital video sharing system 102 and a plurality of client devices, an example of which is illustrated as client device 104. The digital video sharing system 102 and the client device 104 are communicatively coupled, one to another, via a network 106. Computing devices that implement the digital video sharing system 102 and the client device 104 are configurable in a variety of ways.

A computing device, for instance, is configurable as a desktop computer, a laptop computer, a mobile device (e.g., assuming a handheld configuration such as a tablet or mobile phone), and so forth. Computing devices range from full resource devices with substantial memory and processor resources (e.g., personal computers, game consoles) to a low-resource devices with limited memory and/or processing resources (e.g., mobile devices). Additionally, although a single computing device is shown and described in instances in the following discussion, a computing device is also representative of a plurality of different devices, such as multiple servers utilized by a business to perform operations "over the cloud" as described in FIG. 13.

The digital video sharing system 102 includes a service manager module 108 that is configured to implement digital services that are accessible to a client device 104 via the network 106. The client device 104, for instance, includes a communication module 110 (e.g., configured as a browser, network-enabled application, and so on) to access a digital video manager module 112. The digital video manager module 112 is representative of functionality to control access to digital videos 114 stored in a storage device 116. The digital video manager module 112, for instance, is configured to support access to hundreds of millions of digital videos 114 relating to a multitude of topics via the network 106 to billions of different client devices 104. As previously described, however, consumption of digital videos 114 involve unique challenges including focus on the part of a user that watches the digital video, time commitment involved in watching the digital video, and so on.

Accordingly, the digital video sharing system 102 includes a digital document generation system 118 that is configured to generate digital documents 120, which are illustrated as stored in a storage device 122. The digital documents 120 are generated automatically and without user intervention by the digital document generation system 118 to include a sequence of steps as textual components that describe entities and corresponding action descriptions. In an example, the steps are user selectable to navigate to corresponding portions of the digital video, e.g., action clips that correspond to the steps through selection of the text and/or associated images.

Continuing with the previous examples the digital document 120 is generated from digital videos 114 describing how to change a tire. An example of the digital document 120 is depicted in a user interface 124 rendered by a display device 126 of the client device 104. The example includes an ordered sequence of steps as entity/action descriptions based on the digital video 114. This example also includes a representative digital image of a result of the steps in the sequence. The entities in this example pertain to tools and car parts involved in changing a tire and the action descriptions are instructions involving use of those tools and car parts. As a result, the digital document 120 is configured for efficient consumption and overcomes the challenges and inefficiencies in consuming digital videos 114 using conventional techniques.

Digital videos 114 are available in abundance. However, the nature of digital videos 114, although supporting an ability to provide a rich description of a topic of interest, typically involves a significant time commitment, e.g., to view several hours of digital videos 114 that pertain to the topic of interest. These challenges are multiplied due to the diversity and the variety introduced in real world scenarios involving an association of several digital videos 114 with a given topic of interest by the digital video sharing system 102.

Accordingly, the digital document generation system 118 is configured as a machine learning-based system for automated digital document 120 generation from a collection of digital videos 114. The digital document generation system 118 supports author-guided document generation for those looking for authoring assistance and an efficient consumption experience by leveraging text. The digital document generation system 118 is also configurable to support user inputs to choose several visual and semantic preferences for the digital document 120, thereby enabling generation of custom digital documents automatically and without further user intervention from a given set of inputs.

The digital document generation system 118 also supports an ability to generate a single digital document 120 based on a plurality of digital videos 114. Availability of multiple digital videos for a given topic of interest brings in diversity in terms of different perspectives of achieving a desired outcome, however it often takes several hours to consume these multiple digital videos using conventional techniques. To overcome this challenge in the techniques described herein, the digital document generation system 118 is configured to form a single digital document 120 from a plurality of digital videos 114. This improves both user efficiency and efficiency in computational resource consumption of computing devices that implement these techniques. Further discussion of these and other examples is included in the following section and illustrated using corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to particular combinations represented by the enumerated examples in this description.

Automated Digital Document Generation

Figure 9:
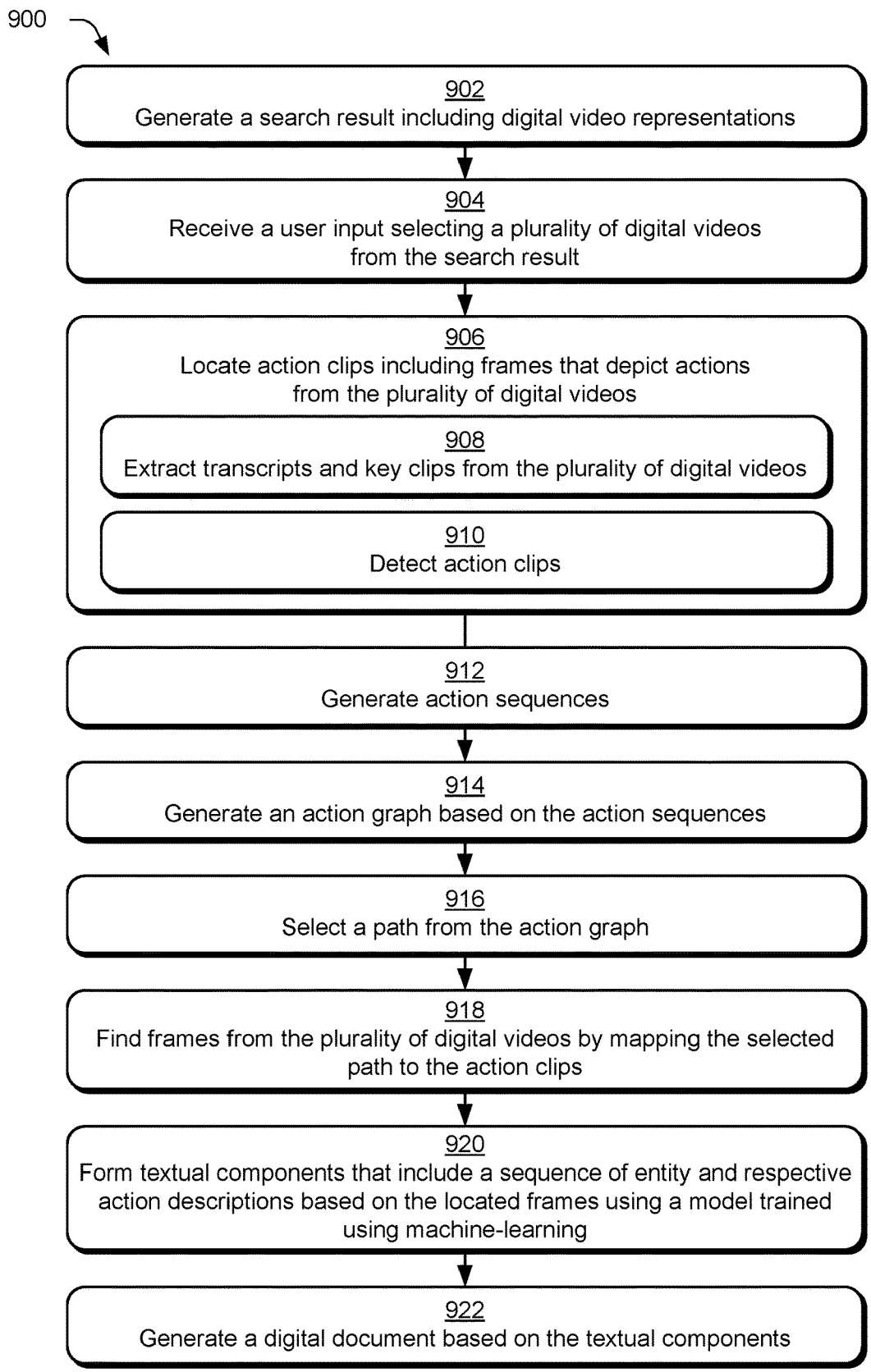
FIG. 9 is a flow diagram depicting a procedure in an example implementation of automated digital document generation from digital videos.

The following discussion describes techniques that are implementable utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-13. The following discussion references systems and user interfaces described in parallel with a procedure 900 of FIG. 9 detailing automated digital document generation from digital videos.

Figure 2:
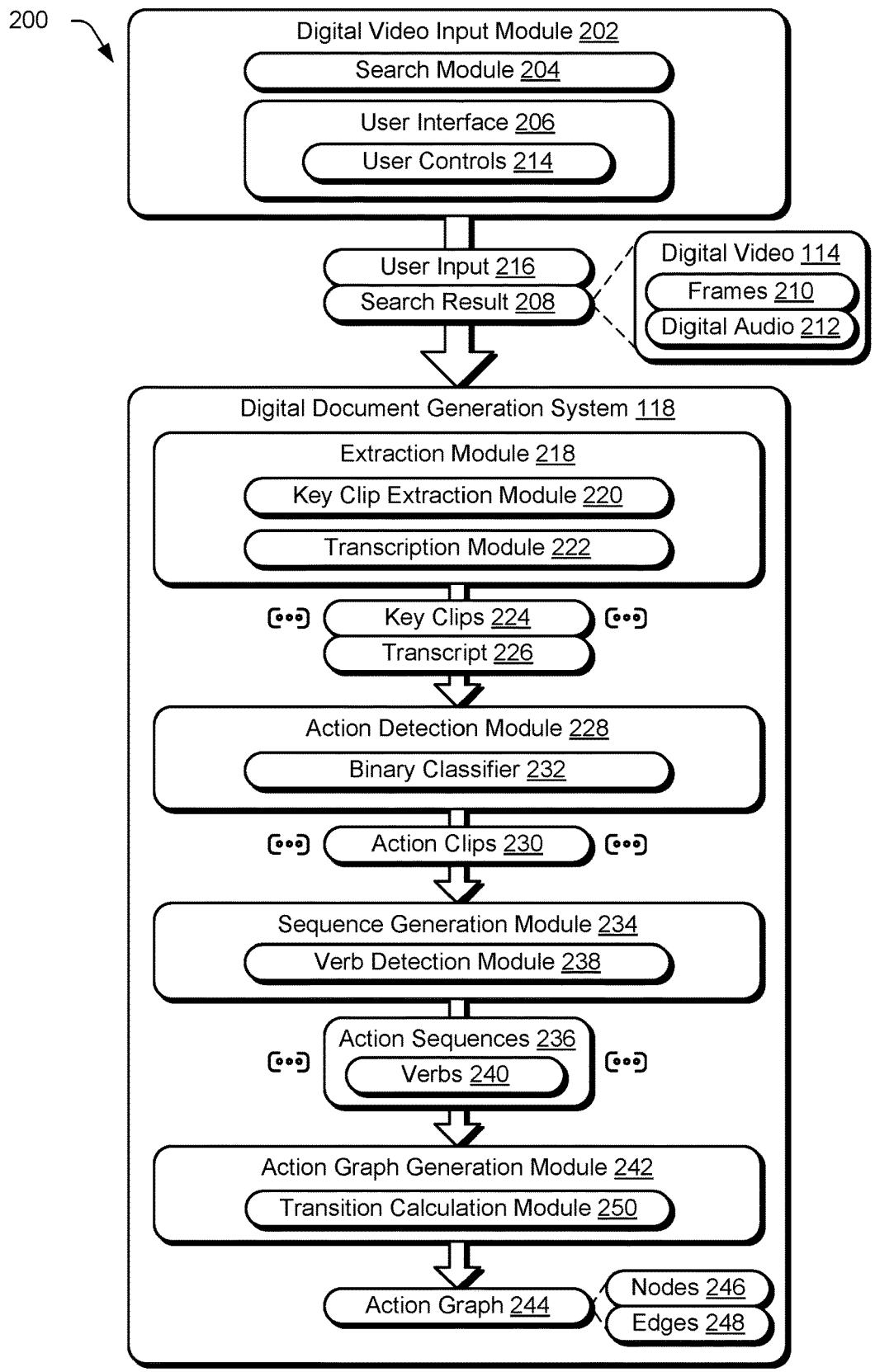
FIG. 2 depicts a system showing operation of a digital document generation system in greater detail as generating an action graph.

FIG. 2 depicts a system 200 showing operation of the digital document generation system 118 in greater detail as generating an action graph. To begin in this example, a digital video input module 202 is configured to input a plurality of digital videos 114 that are to be used as a basis to generate the digital document 120. In a first example, the input is performed via a manual selection on the part of a user through interaction with a user interface, e.g., as an upload, a "drag-and-drop," and so forth. In another example, a search module 204 is configured to output a user interface 206 that receives a search query, and from this, generates a search result 208 having digital video representations of digital videos (block 902) located based on the search query.

Figure 3:
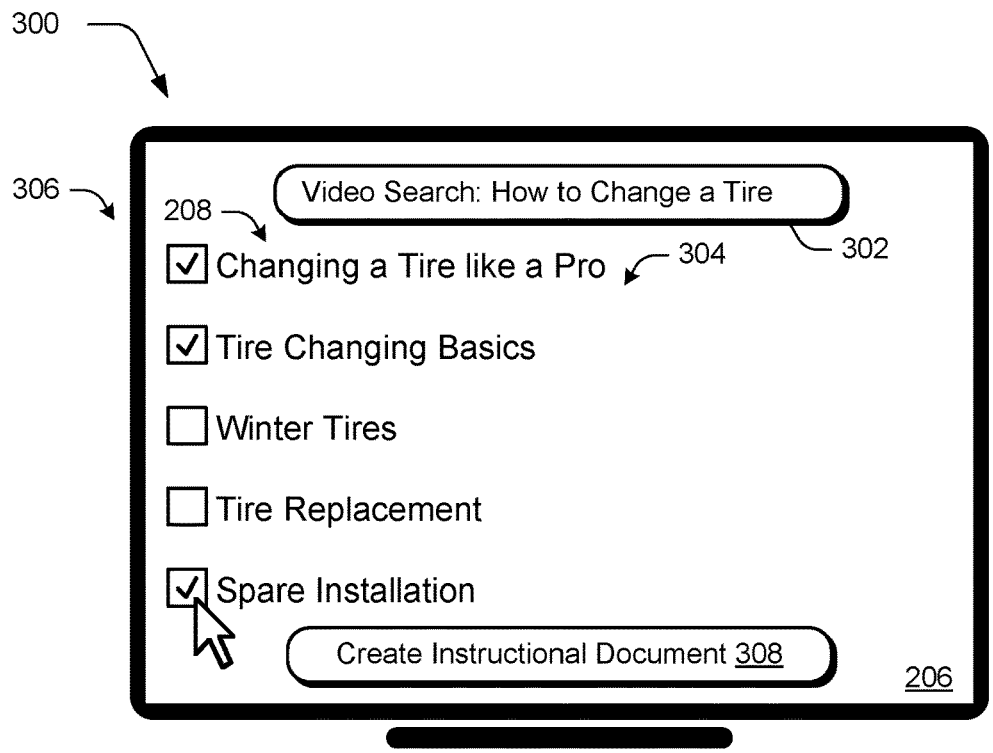
FIG. 3 depicts an example implementation of a user interface of FIG. 2 that is output by a search module showing search results.

FIG. 3 depicts an example implementation 300 of the user interface 206 of FIG. 2 that is output by the search module 204 showing a search result 208. The user interface 206 includes an input portion 302 showing a text query used to perform the search by the search module 204, e.g., "How to Change a Tire." The search result 208 includes representations 304 of digital videos (e.g., titles, thumbnails, and so forth) located based on the query. Options 306 are provided to select individual representations to be used as a basis to generate the digital document by the digital document generation system 118 (block 904). The user interface 206 also includes an option 308 to "create instructional document." Selection of the option 308 supports an ability in this example to specify constraints to be used in generating the digital document 120.

Figure 4:
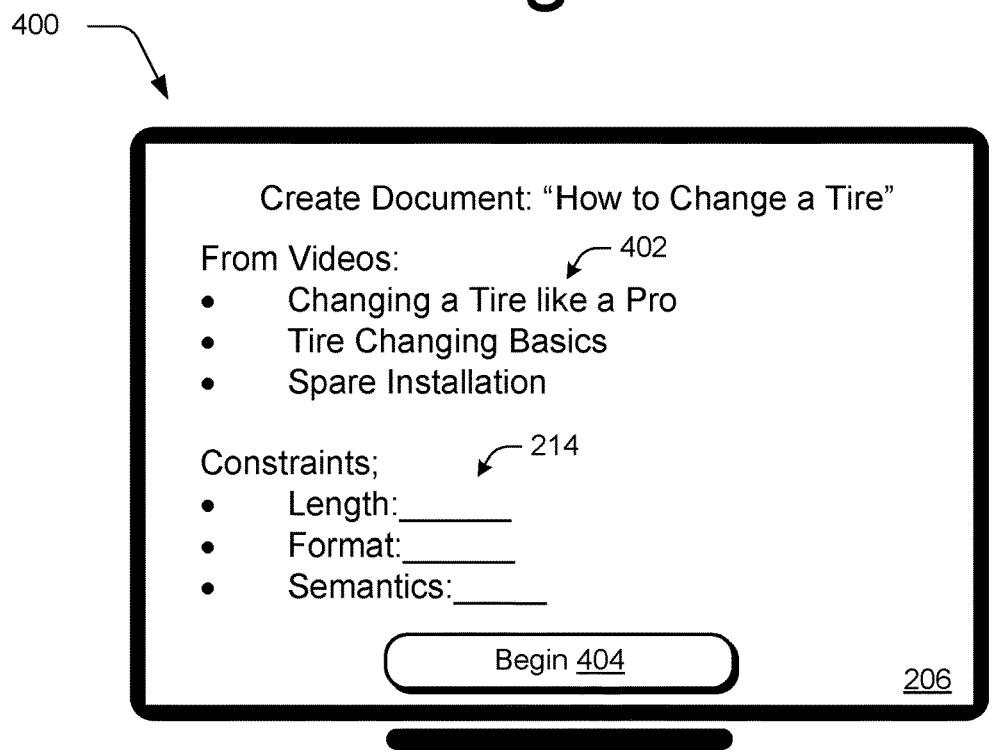
FIG. 4 depicts an example implementation of a user interface of FIG. 2 that is output by the search module.

FIG. 4 depicts an example implementation 400 of the user interface 206 of FIG. 2 that is output by the search module 204. The user interface 206 includes user controls 214 supporting user inputs 216 to specify constraints to be used in generating the digital document 120. The user interface 206 depicts representations 402 of digital videos 114 that are to be used as a basis to generate the digital document 120 as described in relation the FIG. 3.

The user interface 206 also includes user controls 214 to specify constraints to be used in generating the digital document 120. The constraints are usable to specify a length (e.g., number of steps, amount of text), format (e.g., webpage, portable document format), semantics (e.g., topic domain, formal, engineering, marketing), layout, whether to include a visual component (e.g., a "hero image"), and so forth as further described below. A user input selecting an option 404 to "begin" causes the digital document generation system 118 to generate the digital document 120 by passing this information from the digital video input module 202. The information references the selected digital videos 114 having frames 210 and corresponding digital audio 212.

The digital document generation system 118 begins by locating action clips. The action clips includes frames that depict actions from the plurality of digital videos 114 (block 906). To do so, an extraction module 218 is employed that includes a key clip extraction module 220 and a transcription module 222. The key clip extraction module 220 is configured to extract key clips 224 of frames 210 from the digital videos 114, e.g., as collection of a predetermined number of frames, using machine learning and object recognition to detect inclusion of entities in frame groupings, and so forth. The transcription module 222 is configured to perform speech-to-text techniques that are usable to convert the digital audio 212 into text as part of the transcript 226, e.g., by accessing an application programming interface (API) of a digital service (block 908).

The key clips 224 and transcript 226 are then passed to an action detection module 228 to detect action clips 230 (block 910). The action detection module 228 is configurable to employ neural action clip selection through use of a binary classifier 232 that computes a combed representation of key clips 224 (e.g., using ResNet-50 as described by Kaiming He, Xiangyu Zhang, Shaoqing Ren, and Jian Sun. *Deep residual learning for image recognition.* In CVPR, 2016) and corresponding portions of the transcript 226, e.g., as bidirectional transformers an example of which is described by Devlin, Jacob, et al. "Bert: Pre-training of deep bidirectional transformers for language understanding." arXiv preprint arXiv:1810.04805 (2018). This classifier is trained using binary cross entropy loss defined as:

$$L_{bce} = \frac{1}{N} \sum_{i=1}^{N} -(y_i * \log(p_i) + (1-y_i) * \log(1-p_i))$$

where "$y_i$" is the ground-truth, "$p_i$" is the probability computed by the model of the key clips 224 being an action clip 230, and "N" is the number of training samples.

The action clips 230 are then received as an input by a sequence generation module 234 to generate action sequences 236 from the digital videos 114 (block 912). The action sequences 236 describe sequences of verbs 240 in respective digital videos, e.g., one or more per video. Thus, the action sequences 236 capture an order of "what has occurred" in the respective digital video 114.

The sequence generation module 234 employs a verb detection module 238 that is configured to detect verbs 240 from the action clips 230 and/or transcript 226. In one example, this is performed using bidirectional transformers trained for natural language understanding for semantic-role labeling, which can be fine-tuned for a specific domain. The verb detection module 238, for instance, is configurable using machine learning to process frames of the action clips 230 identified by the action detection module 228 to detect which verbs are usable to describe "what is going on" in the frames of the action clips 230. In another example, the verb detection module 238 identifies the verbs 240 from portions of the transcript 226 that correspond to the action clips 230. Semantic role labeling analyzes natural language sentences to extract information about "who did what to whom, when, where, and how." Because each verb in the transcript 226 does not correspond to an action for an instruction (e.g., "keep" in "keep stirring the soup"), a domain-specific dictionary is employable by the sequence generation module 234 as a filter to remove potentially misleading text. The dictionary is also learnable from an enterprise corpus, author-defined input, and so on.

The action sequences 236 are passed by the action clip detection module 234 to an action graph generation module 242 to generate an action graph 244 (block 914). In one example, the action sequences 236 are generated by the sequence generation module 234 at a level of granularity of one per video. In order to capture nuances from a plurality of digital videos 114, the action graph generation module 242 is configured to generate the action graph 244 from the action sequences 236 of verbs 240 extracted from the plurality of digital videos 114.

The action graph 244 includes nodes 246 that corresponding to actions (e.g., verbs 240) that are connected by edges 248. The edges 248 are weighted based on a probability of transition from one node to another (and thus from one verb to another) as calculated based on a transition calculation module 250. Thus, the action graph 244 is configured as a weighted directed graph. In one example, the transition probably for each verb 240 pairing in calculated as:

$$\text{trans\_prob}(v_1, v_2) = \frac{\text{pt}_{count}(v_1, v_2)}{\text{total\_trans}}$$

where "$\text{pt}_{count}(v_1, v_2)$" is a count of occurrences of "$v_2$" after "$v_1$" in the action sequences 236, and "total trans" is a total number of transitions for the verbs 240 in the action sequences 236. The action graph generation module 242 adds a token (e.g., background token) to the start and end of the action sequences 236 when forming the action graph 244. The action graph generation module 242 also removes self-loops from the action graph 244 to avoid deadlocks during graph traversal as further described below in relation to a corresponding figure.

Figure 5:
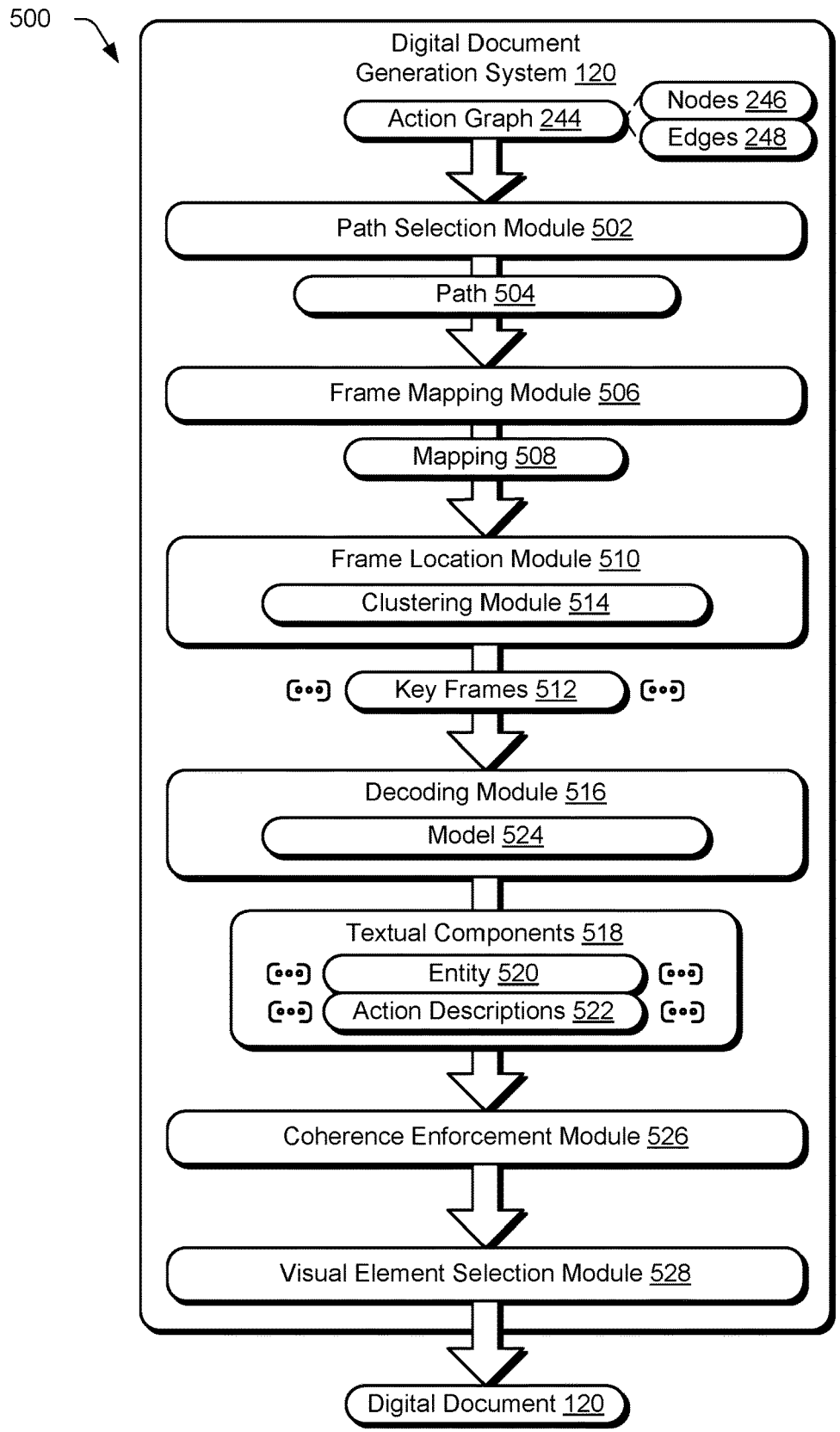
FIG. 5 depicts a system showing operation of a digital document generation system in greater detail as generating a digital document based on the action graph generated with respect to FIG. 2.

FIG. 5 depicts a system 500 showing operation of the digital document generation system 118 in greater detail as generating a digital document 120 based on the action graph 244 generated with respect to FIG. 2. The action graph 244 is passed as an input from the action graph generation module 242 to a path selection module 502. The path selection module 502 is configured to select a path 504 by traversing the action graph 244 (block 916), e.g., based on the weighted edges 248 between the nodes 246.

To do so, the path selection module 502 computes a plurality of candidate paths having tokens as both source and destination nodes. This is performable using a variety of techniques, examples of which include a depth-first search (O(V+E) and Dijkstra (O(E+VlogV)) algorithm over a threshold number of traversals, e.g., fifteen thousand. An example 1000 of this algorithm is illustrated in FIG. 10 as "Algorithm 1: The Traversal Algorithm."

From the plurality of candidate paths, the path selection module 502 generates the path 504 by greedily choosing the candidate path that maximize a sum of edge weights. An example 1100 of an algorithm usable to perform this selection is illustrated in FIG. 11 as "Algorithm 2: The Path Selection Algorithm."

The path 504 is then used by a frame mapping module 506 to map nodes from the path 504 to corresponding action clips 230. A frame location module 510 is configured to find frames (e.g., key frames 512) based on the mapping 508 (block 918). As part of locating the key frames 512, the frame location module 510 is configured to remove noise, e.g., by filtering blurry frames. The filtered frames are clustered (e.g., using k-means clustering) by a clustering module 514 into action/verb groups for multiple frames corresponding to an action clip 230. For each frame in a cluster, a joint frame/transcript (i.e., image/text) representation is generated to compute a centroid. A variety of techniques are usable, an example of which is described by Radford, Alec, et al. "Learning transferable visual models from natural language supervision." *arXiv preprint arXiv:2103.00020* (2021). The frame closest to the centroid (e.g., having the least Euclidean distance) is selected as the key frame 512 for that action/verb cluster.

The decoding module 516 is configured to form textual components 518 that include a sequence of entity 520 and respective action descriptions 522 using a model 524 trained using machine learning (block 920). To do so, the decoding module 516 is configured to obtain the key frames 512 that are representative of the clusters along with content associated with the digital videos 114, e.g., titles, content outline, synopsis.

Figure 6:
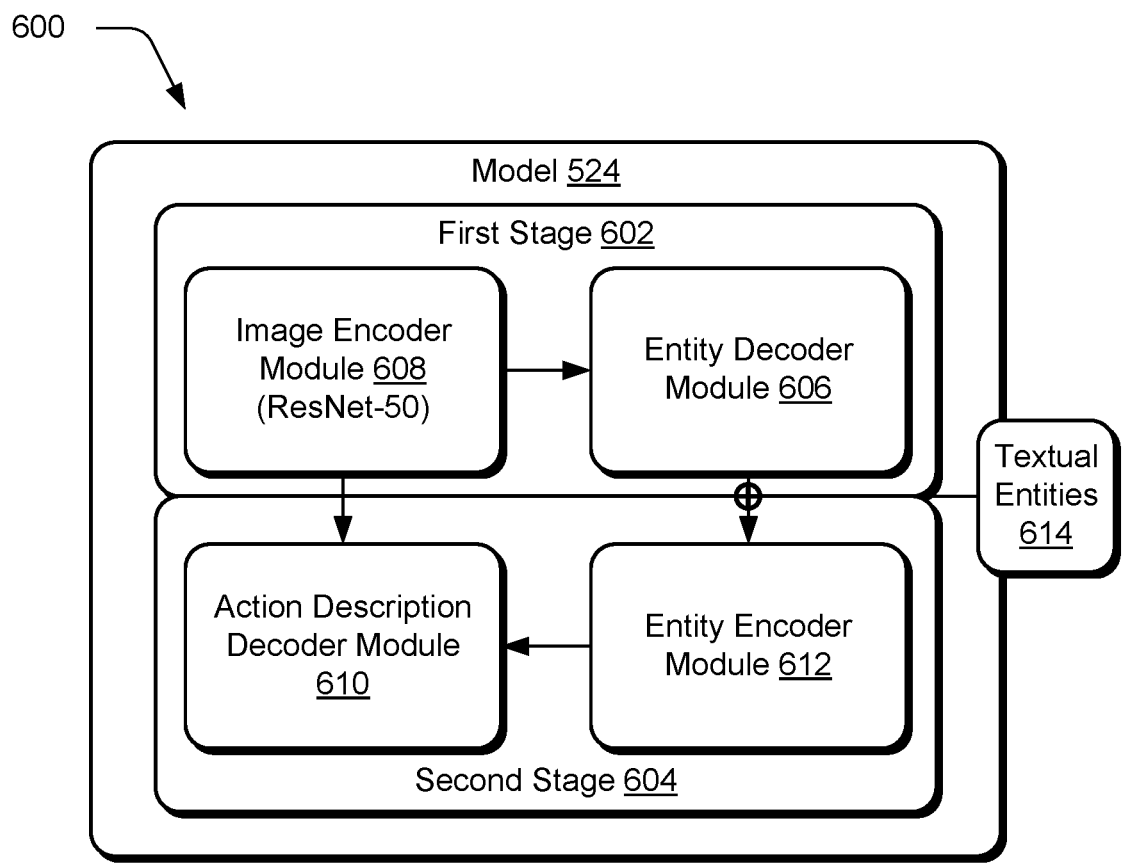
FIG. 6 depicts an example system showing configuration of a machine-learning model of FIG. 5 in greater detail.

FIG. 6 depicts an example system 600 showing configuration of the model 524 of FIG. 5 in greater detail. The model 524 includes a first stage 602 and a second stage 604. The first stage 602 includes an entity decoder module 606 and an image encoder module 608 and the second stage 604 includes an action description decoder module 610 and an entity encoder module 612.

The entity decoder module 606 is used to generate entities 520 for each of the key frames 512. Thus, the entity decoder module 606 takes as an input digital images from the key frames 512 and the output is a list of entities corresponding to the key frames 512, which defines a respective sequence of steps. Similarity, entity 520 information is also extracted from corresponding portions of the transcript 226, e.g., using a lookup against a domain or enterprise specific corpora.

The generated entities, along with textual entities 614 for each of the key frames 512 are fed to the action description decoder module 610 to generate the action descriptions (e.g., instructions) for respective key frames 512, thereby forming a respective step in the sequence of textual components 518. The textual entities 614 are added in one example to account for entities that are missed through processing of the key frames 512 by the entity decoder module 606. This supports a multi-modal input that leverages different modalities (e.g., text, image, and/or audio) to complement each other and improve accuracy and operational efficiency of computing devices that implement these techniques.

The model 524 is implemented as a transformer and ResNet-50 based encoder-decoder-decoder model that is extended to generate entities and action descriptions (e.g., ingredients and instructions) at an intermediate frame level, in which, the digital image may not contain a finalized version of the topic. This supports numerous technical advantages. One such advantage is gained by providing an action description decoder module 610 with increased context in order to attend to a frame describing an action performed, instead of attending to a finalized version. The entity decoder module 606, trained on intermediate frames, captures additional information as well as entities used in the sequence that are not visible in a finalized image. For example, use of "salt" is invisible in a finalized digital image of a cake but is visible in a frame in which an action description "add salt" is performed.

The model 524 is trained in two stages. In an implementation, weights of the encoders and decoders are partially initialized from a pre-trained model for faster training. Partial loading, for instance, is performable because the pre-trained model is trained on a different dataset than the dataset used for fine-tuning the extended model, leading to a different vocabulary size. At inference time, the entities generated for each intermediate frame are fed along with the textual entities to the action description decoder module 610 to generate the action description, e.g., instructions. Both the entity and action descriptions are generated using a greedy search decoding technique in which a token with maximum probability is chosen at each time step. This results in a sequence of textual components 518 having corresponding entity 520 and respective action descriptions 522. A digital document 120 is then generated based on the textual components 518 (block 922), e.g., by ordering the sequence within a webpage, spreadsheet, word-pressing document, presentation, and so forth.

Additional processing may also be employed by the digital document 120, e.g., to improve readability, include representative digital images, and so forth. A coherence enforcement module 526, for instance, processes the sequence of textual components 518 to ensure language consistency of steps in the sequence. This includes addition of pronouns, evaluation of repeated language, and so on to promote a "flow" in text in the steps as proceeding through the sequence using natural language processing.

In another instance, a visual element selection module 528 is configured to select representative digital images, e.g., for individual steps, for the digital document 120 as a whole, and so forth. In a "text heavy" scenario, for instance, a single "hero" digital image is selected by the visual element selection module 528. To do so, the visual element selection module 528 obtains a segment of frames corresponding to a predefined amount of time at an end of the digital video 114, e.g., a final sixty seconds. For this, entities for each frame in the selected segment (e.g., using an encoder-decoder-decoder model) are generated. A frequency distribution of the predicted entities across these frames is calculated. Entities having a relatively low frequency (e.g., experimental threshold set to "$(min_f+min_f)/2)$") are removed where "$min_f$" is a minimum frequency and "$max_f$" is the maximum frequency. The digital image included to a frame, for which, a predicted entity has a maximum overlap with the entity's subset is selected as the "hero image." For a visually heavy output format (e.g., selected as a constraint), frames corresponding to each of the verbs in the path 504 are generated. The frames, for instance, are selected from corresponding action clips taken from corresponding digital videos of the plurality of digital videos.

As previously described, the digital document 120 supports use of user controls 214 to specify constraints that are then to be used to control generation of the digital document 120. Examples of these constraints include length, arrangement, semantics, and so on.

In a length example, the user inputs 216 define a number of steps in the sequence to be used to generate the digital document 120. To do so, the path selection module 502 generates the path 504 to have a corresponding number of steps from the action graph 244. For each path computed using the traversal algorithm of FIG. 10, for instance, paths are selected having a length equal to the specified length, which is expandable to address situations in which an exact length is not available from the graph. Then, the path selection algorithm of FIG. 11 is used to determine a most probable action sequence of the desired length.

In an example of semantic change, once a draft digital document 120 is output for viewing by a user, inputs are received to remove extraneous steps. Content of the digital document 120 is then adapted accordingly by the coherence enforcement module 526. FIG. 12 depicts an example implementation 1200 of a mid-way step removal algorithm In this example, backtracking and partial path queries are used to select possible paths as the selected path in conjunction with the path selection algorithm of FIG. 11.

Figure 7:
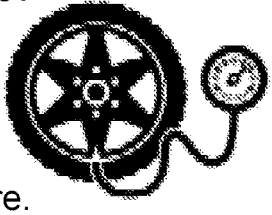
FIG. 7 depicts an example of output of a draft digital document, in which an option to edit a draft digital document is selected.
Figure 8:
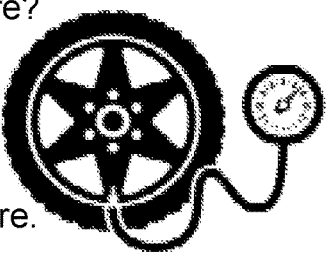
FIG. 8 depicts an example of an edit made to the draft digital document of FIG. 7.

FIG. 7 depicts an example 700 of output of a draft digital document 120, in which an option 702 to edit the digital document 120 is selected. A subsequence user input is received to remove Step 9, which is considered redundant by a user. In response, as shown in the example 800 of FIG. 8 the coherence enforcement module 526 removes the step, and edits the language of a subsequent step 10, e.g., from "continue lowering vehicle and finish tightening" to "lower vehicle and finish tightening" responsive to removal of "lower vehicle partially, continue tightening." An option 802 is also provided to save the digital document 120 to save the edits.

FIG. 13 depicts an example 1300 of an entity-node removal algorithm in which the entity is an ingredient, e.g., in a recipe scenario. In a semantic change example, entities are removed from the draft digital document, e.g., depending on previously supplied constraints, subsequence user inputs, and so forth. Metadata augmented in the action graph 244 (e.g., synonyms, tags, semantic qualification on criteria such as availability, etc.) are used to filter nodes. A new set of action sequences are generated as per the traversal algorithm of FIG. 10 and a path is selected as described by the path selection algorithm of FIG. 11. In a layout change constraint example, a range of output layout templates provided that are user selectable. These layout templates range from text dominant output to short visually rich output. The visual element selection module 528 is triggered according to the output format specified. As a result, the digital document 120 is usable to concisely describe content of a plurality of digital videos in a format that is readily consumable in a variety of scenarios which is not feasible in conventional consumption techniques.

Example System and Device

Figure 14:
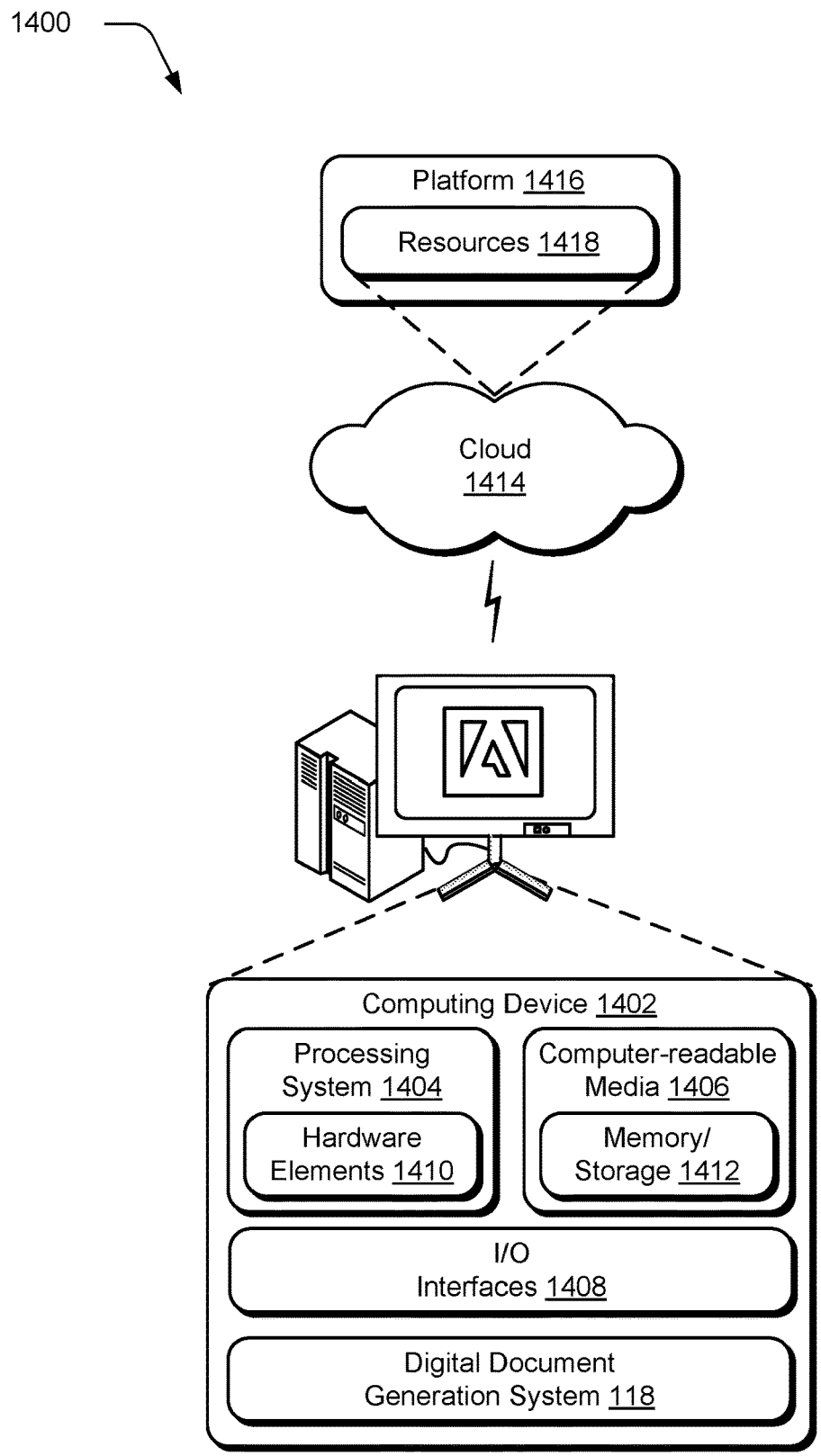
FIG. 14 illustrates an example system including various components of an example device that can be implemented as any type of computing device as described and/or utilize with reference to FIGS. 1-13 to implement embodiments of the techniques described herein.

FIG. 14 illustrates an example system generally at 1400 that includes an example computing device 1402 that is representative of one or more computing systems and/or devices that implement the various techniques described herein. This is illustrated through inclusion of the digital document generation system 118. The computing device 1402 is configurable, for example, as a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interface 1408 that are communicatively coupled, one to another. Although not shown, the computing device 1402 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that is configurable as processors, functional blocks, and so forth. This includes implementation in hardware as an application specific integrated circuit or other logic device formed using one or more semiconductors. The hardware elements 1410 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1406 is illustrated as including memory/storage 1412. The memory/storage 1412 represents memory/storage capacity associated with one or more computer-readable media. The memory/storage 1412 includes volatile media (such as random access memory (RAM)) and/or nonvolatile media (such as read only memory (ROM), Flash memory, optical disks, magnetic disks, and so forth). The memory/storage 1412 includes fixed media (e.g., RAM, ROM, a fixed hard drive, and so on) as well as removable media (e.g., Flash memory, a removable hard drive, an optical disc, and so forth). The computer-readable media 1406 is configurable in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1402. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1402, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1410. The computing device 1402 is configured to implement particular instructions and/or functions corresponding to the software and/or hardware modules. Accordingly, implementation of a module that is executable by the computing device 1402 as software is achieved at least partially in hardware, e.g., through use of computer-readable storage media and/or hardware elements 1410 of the processing system 1404. The instructions and/or functions are executable/operable by one or more articles of manufacture (for example, one or more computing devices 1402 and/or processing systems 1404) to implement techniques, modules, and examples described herein.

The techniques described herein are supported by various configurations of the computing device 1402 and are not limited to the specific examples of the techniques described herein. This functionality is also implementable all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 abstracts resources and functions to connect the computing device 1402 with other computing devices. The platform 1416 also serves to abstract scaling of resources to provide a corresponding level of scale to encountered demand for the resources 1418 that are implemented via the platform 1416. Accordingly, in an interconnected device embodiment, implementation of functionality described herein is distributable throughout the system 1400. For example, the functionality is implementable in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   locating, by the computing device, action clips including frames that depict actions from a plurality of digital videos;
   generating, by the computing device, an action graph based on the action clips;
   selecting, by the computing device, a path based on the action graph;
   finding, by the computing device, frames from the plurality of digital videos by mapping nodes of the path to the action clips;
   forming, by the computing device, textual components that include a sequence of entity and respective action descriptions based on the frames using a model trained using machine-learning;

generating, by the computing device, a digital document based on the textual components; and rendering the digital document by a display device.

2. The method as described in claim 1, wherein the forming employs at least one user-specified constraint.

3. The method as described in claim 2, wherein the at least one user-specified constraint includes length of the digital document, a number of steps, semantics, or layout.

4. The method as described in claim 1, wherein the locating includes:

extracting key clips from the plurality of digital videos; and detecting the action clips as including frames that depict actions from the key clips.

5. The method as described in claim 4, wherein the locating the action clips is performed using a binary classifier that computes a combined representation based on the key clips and respective portions of transcripts generated from the plurality of digital videos.

6. The method as described in claim 1, wherein the action graph includes nodes representing actions and edges having weights based on probabilities of transition between the nodes, respectively.

7. The method as described in claim 6, wherein the selecting the path includes traversing the nodes of the action graph based on respective said probabilities.

8. The method as described in claim 1, wherein the forming by the machine-learning model includes processing the frames along with respective portions of transcripts generated from the plurality of digital videos.

9. The method as described in claim 1, wherein the generating the digital document includes selecting a digital image from the action clips based on contribution of the digital image to the path and including the digital image as part of the digital document.

10. The method as described in claim 1, wherein the forming includes selecting a digital image from at least one said frame included within a defined portion of a respective said digital video.

11. A system comprising:

a processing system;

a non-transitory computer readable media communicatively coupled to the processing system;

an action detection module implemented by the processing system to locate action clips including frames that depict actions from a digital video;

an action graph generation module implemented by the processing system to generate an action graph based on the action clips;

a path selection module implemented by the processing system to select a path based on the action graph;

a frame location module implemented by the processing system to locate frames from the digital video based on a mapping nodes of the path to the action clips; and a decoding module implemented by the processing system to form textual components that include a sequence of entity and respective action descriptions based on the located frames using a model trained using machine-learning.

12. The system as described in claim 11, further comprising a search module implemented by the processing system to generate a search result that references a plurality of said digital videos and wherein the action detection module is configured to locate the action clips from the plurality of said digital videos.

13. The system as described in claim 11, further comprising a transcription module implemented by the processing system to extract a transcript from the digital video.

14. The system as described in claim 11, further comprising a key clip extraction module implemented by the processing system to extract key clips from the digital video and an action clip detection module implemented by the processing system to detect the action clips as including frames that depict actions from the key clips.

15. The system as described in claim 14, wherein the action clip detection module implements a binary classifier that computes a combined representation based on the key clips and respective portions of a transcript generated from the digital video.

16. The system as described in claim 11, wherein the action graph includes nodes representing actions and edges having weights based on probabilities of transitions between the nodes, respectively.

17. The system as described in claim 16, wherein the path selection module is configured to select the path by traversing the nodes of the action graph based on respective said probabilities.

18. The system as described in claim 11, wherein the decoding module is configured to process the frames along with respective portions of transcripts generated from the digital video.

19. A system comprising:

means for locating action clips from a plurality of digital videos;

means for generating an action graph based on the action clips;

means for selecting a path based on the action graph;

means for locating frames from the plurality of digital videos based on the path;

means for forming textual components that include a sequence of entity and respective action descriptions based on the located frames using a model trained using machine-learning; and means for generating a digital document based on the textual components.

20. The system as described in claim 19, wherein the model is implemented using an encoder-decoder network as part of machine learning.

* * * * *